May 13, 1941.   S. E. BUCKLEY   2,242,173
METHOD FOR RECOVERING LIQUIDS FROM GASES
Filed March 31, 1939   4 Sheets-Sheet 1
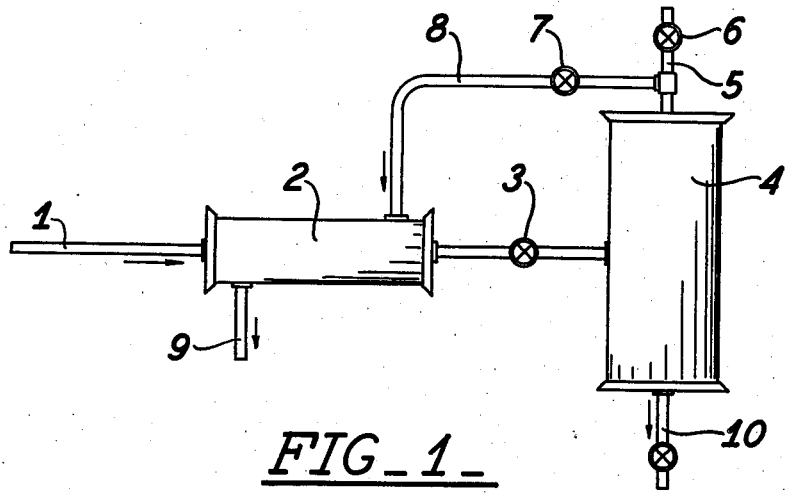
FIG_1_
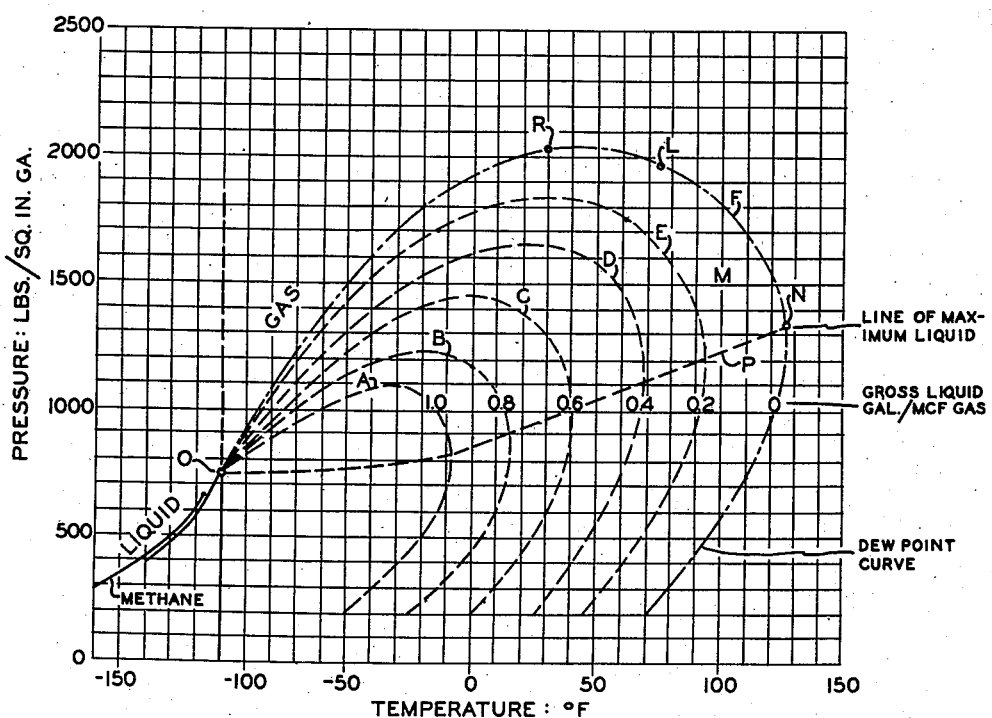
FIG_2_
INVENTOR.
BY Stuart E. Buckley
P. L. Young   ATTORNEY.

May 13, 1941.  S. E. BUCKLEY  2,242,173
METHOD FOR RECOVERING LIQUIDS FROM GASES
Filed March 31, 1939  4 Sheets-Sheet 2
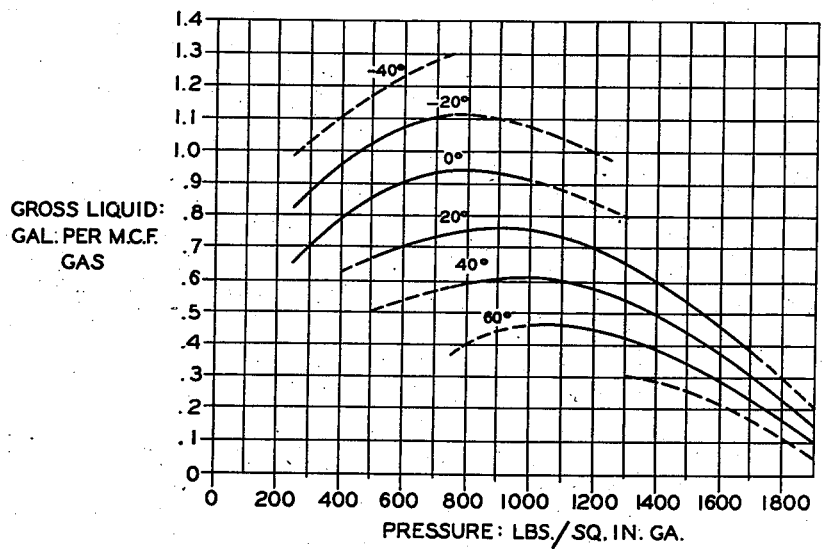
FIG_3_
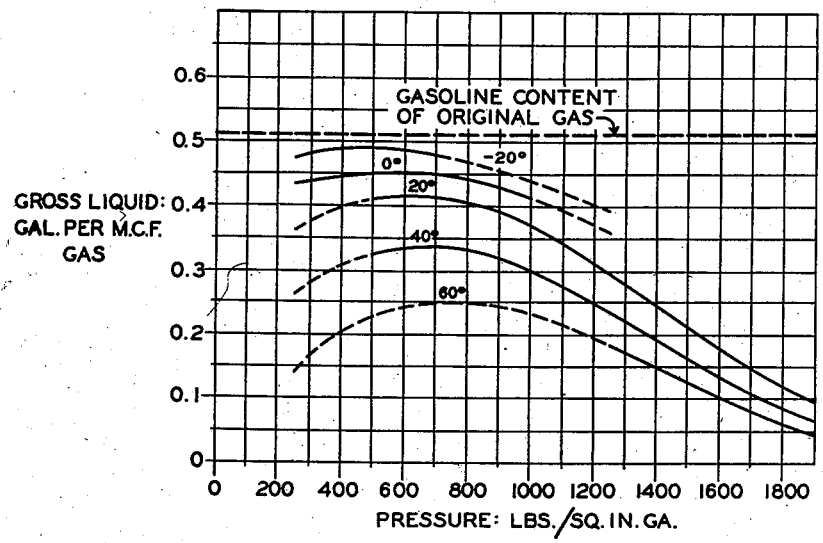
FIG_4_
INVENTOR.
BY Stuart E. Buckley
ATTORNEY.

May 13, 1941.  S. E. BUCKLEY  2,242,173
METHOD FOR RECOVERING LIQUIDS FROM GASES
Filed March 31, 1939  4 Sheets-Sheet 3
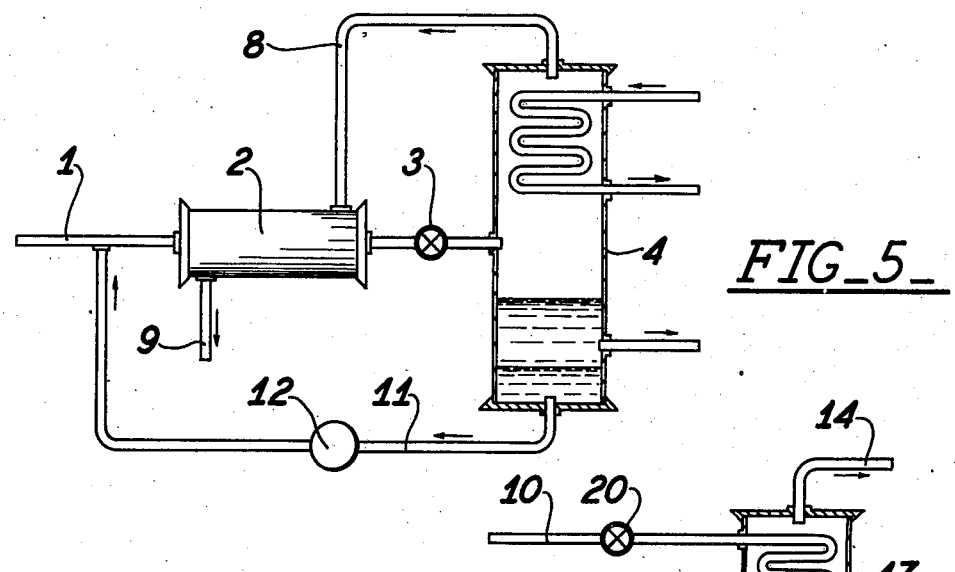
FIG_5_
FIG_6_
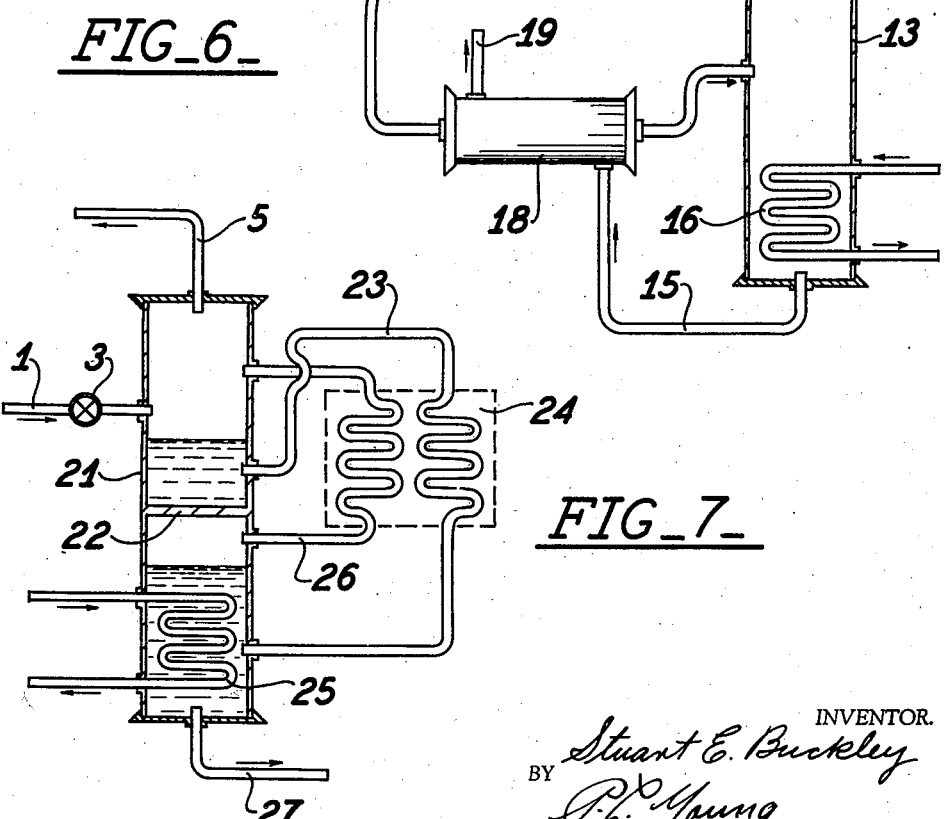
FIG_7_
INVENTOR.
Stuart E. Buckley
BY
ATTORNEY

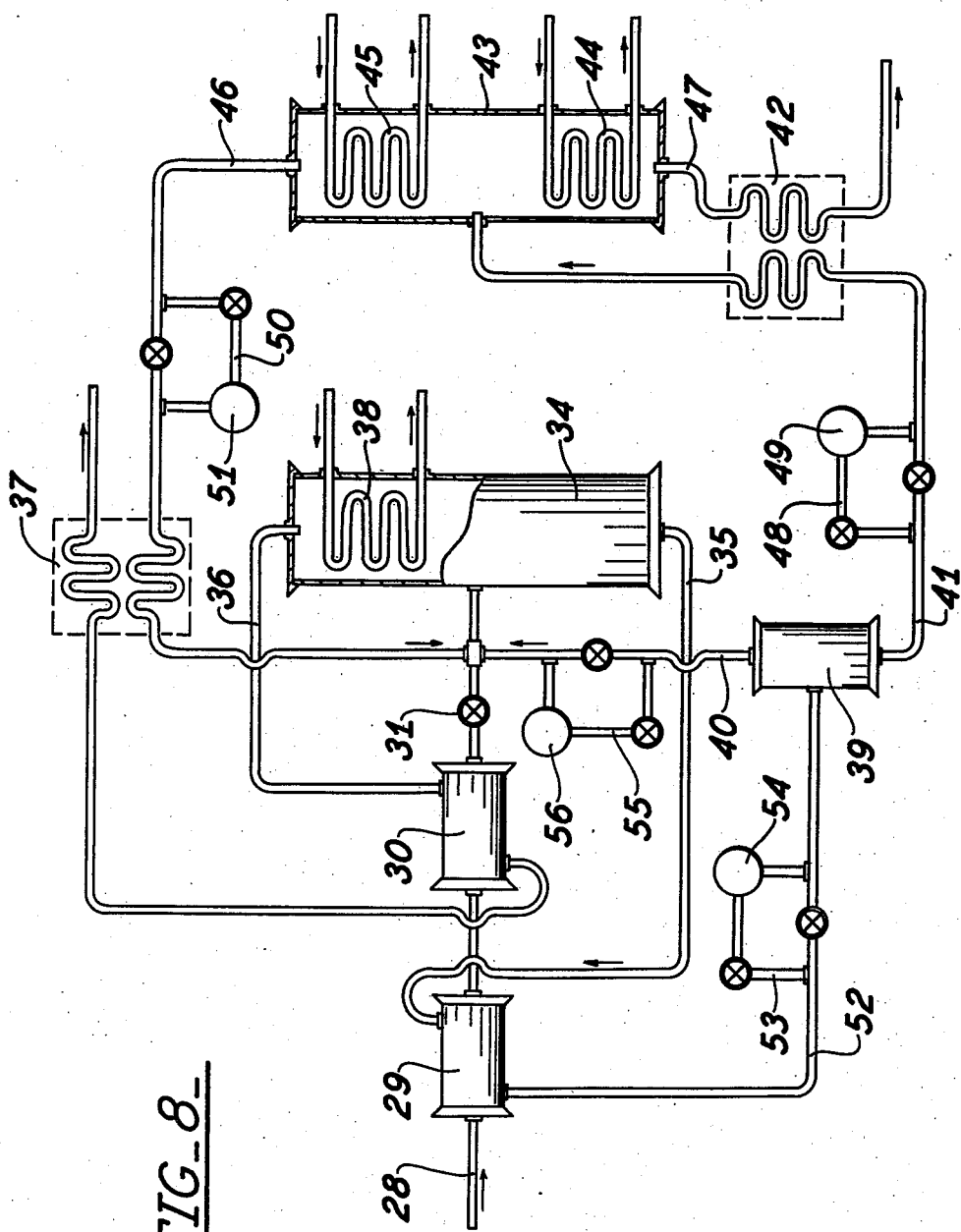

Patented May 13, 1941

2,242,173

UNITED STATES PATENT OFFICE 2,242,173

METHOD FOR RECOVERING LIQUIDS FROM GASES

Stuart E. Buckley, Houston, Tex., assignor to Standard Oil Development Company, a corporation of Delaware Application March 31, 1939, Serial No. 265,095

19 Claims. (Cl. 62—175.5)

The present invention is directed to a method for recovering normally liquid constituents from gases. More specifically, this invention is directed to the recovery of gasoline from natural gas and from refinery gases of a composition similar to that of natural gas.

Natural hydrocarbon gas from different sources contains varying amounts of normally liquid hydrocarbons which are desirable constituents of gasoline. These gases are usually produced at high pressures ranging upwardly of 1000 pounds per square inch. At these pressures and at ordinary temperatures certain phase laws operate which render recovery of the normally liquid constituents by the conventional scrubbing methods difficult or impractical, since, under these conditions, although the gas may contain a substantial percentage of normally liquid components, the gas as a whole has the characteristics of a dry gas. Accordingly, it has been the custom to reduce the gas pressure considerably, so as to make possible a substantial recovery of normally liquid constituents by scrubbing.

On the other hand, it is frequently desirable to recover the normally dry gas at a high pressure, because this gas is frequently used for repressuring the producing substrata. Moreover, it is desirable from an economic point of view to conserve the pressure energy of this gas for useful purposes whether or not it is to be used for repressuring. When the gas is to be used for repressuring, precompression of it before introduction into the producing substrata is necessary and for this reason the important factor to be considered is that the cost of compressing a gas to a certain final pressure multiplies rapidly as the initial pressure of the gas decreases. Accordingly, it is desirable to recover the normal liquid constituents from the gas with as small a reduction of pressure of the gas as is possible, consistent with an economic recovery of liquid constituents. That is to say, a balance must struck between the cost of recompressing the gas and the value of the recovered liquid constituents.

The principal object of the present invention is the provision of a method for recovering normally liquid constituents from gases under high pressure with a minimum reduction in the pressure of gas.

An additional object is a provision of the method of the character described which can be carried out with simplified equipment and with lower operating and maintenance cost with a maximum utilization of the energy contained in the gas.

Another object of the present invention is the provision of a method of the character described in which is included a step of drying the gas so that the equipment will not become plugged with ice and solid hydrates.

Still another object of the present invention is the provision of a method of the character described in which the pressure on the liquid condensate is utilized to produce refrigeration in the further stabilization of this liquid condensate.

A further object of the present invention is the provision of a method of the character described in which the normally dry gas which is dissolved in the liquid condensate recovered is removed from this condensate and subjected to a treatment for the recovery therefrom of condensable constituents which it carries off from the condensate.

Further objects and advantages of the present invention will appear from the following detailed description of the accompanying drawings in which Fig. 1 is a front elevation, partly in section, of one type of apparatus suitable for the practice of the method of the present invention, Fig. 2 is a phase diagram, graphically presenting the phase relations of the liquid and gas phases of a gas mixture of the type to the treatment of which the present invention is applicable.

Fig. 3 is a graph showing the variation in gross liquid recovery from such a gas mixture with pressure at various temperatures, Fig. 4 is a graph showing the variation in net gasoline recovery from such a gas with pressure at various temperatures;

Fig. 5 is a front elevation in diagrammatic form of an apparatus suitable for carrying out the present invention in which a dry gas and a dry condensate are delivered;

Fig. 6 is a front elevation of a section of an apparatus suitable for carrying out that step of the present invention according to which the high pressure of the condensate is utilized in the stabilization of the condensate, Fig. 7 is a front elevation, partly in section, of one type of apparatus suitable for recovering dry gas dissolved in the condensate and introducing this gas into the first condensing zone; and Fig. 8 is a front elevation in diagrammatic form of a different apparatus suitable for effecting the same results.

In Fig. 1 are applied suitable legends from which the nature of the method of the present invention is evident. Briefly, the method consists in conducting high pressure gas from a deposit or from the separator of a refinery plant, which should first be dehydrated by any conventional method or by the method hereinafter described, through a pipe 1, a heat exchanger 2, and an expansion valve 3 into a separator 4, which is maintained at a pressure and temperature within the limits defined hereinafter. The dry gas leaves the separator through a drawoff line 5, which is provided with a valve 6 and leads to a compressor or to any other piece of equipment in which the gas is utilized. If it is desired to precool the feed gas, valve 6 is closed and valve 7 in a branch line 8, leading to the heat exchanger 2, is opened, whereby the cool gas passes in heat exchange relation with the incoming gas. The dry gas leaves the heat exchanger through pipe 9 which is connected to the same equipment as line 6. The liquid products recovered in separator 4 are drawn off through line 10 and conducted to a stabilizer, if necessary, or to storage tanks, or to separators and thence to storage tanks.

In Fig. 2 is shown a phase diagram or a liquid recovery diagram of a gas mixture of the type, to the treatment of which the present invention is directed. In this diagram the various loops A, B, C, D, E and F represent equilibrium curves, by which is meant a curve showing the temperature and pressure through which a system containing the designated amount of liquid in gallons per thousand cubic feet of gas can be carried without evaporation or condensation occurring. For example, any point on curve A shows the temperature and pressure which obtain when the system contains one gallon of liquid for a thousand cubic feet of gas in equilibrium.

The diagram shown in Fig. 2 represents the phase relation of a mixture of a plurality of hydrocarbons of various boiling points. For this reason, there are a plurality of envelopes, each designating equilibrium temperatures and pressures for a different liquid content of condensate. It will be observed that the amount of condensate designated by the envelopes increases in general with a decrease in temperature. It will also be observed that the critical temperature, due to the large amount of methane present, is very close to the pressure axis and is designated by point O. At any temperature higher than the critical temperature and outside of envelope F, the system is wholly in the vapor or gas phase, while at any temperature below the critical temperature and outside of the envelope the system is wholly in the liquid phase. A line drawn from O to the temperature axis cuts off a sector of the diagram to the right of this line in which retrograde action occurs. Along the curve F is a point N which indicates a temperature at which condensation cannot be effected by an increase or decrease in pressure. In other words, it designates a temperature beyond which any change in pressure cannot affect the condensation. This point is known as cricondentherm. Each of these curves A, B, C, D and E has a similar point, and a line P drawn through these points designates the pressure at which maximum liquid recovery can be had at any given temperature, and vice versa. That is to say, line P is the line of maximum gross liquid production.

Any condensation resulting from a decrease in pressure from a point above line P is retrograde condensation. For example, assume that a mixture exists at a temperature of about 30° F., as a gas. This point is indicated as point R. It can be seen that a reduction in pressure causes condensation, such that at 1840 pounds pressure 0.2 gallon per 1000 cubic feet will be formed, and that at 1660 pounds per square inch 0.4 gallon will be formed, and that at 1300 pounds per square inch 0.6 gallon will be formed, while at 980 pounds per square inch a point of maximum condensation or about 0.7 gallon per 1000 cubic feet is reached. Thereafter a decrease in pressure causes vaporization, such that at about 200 pounds per square inch less than 0.4 gallon of condensate will remain.

It will be understood that below line P condensation follows the conventional law and increases with pressure and decreases with temperature. It should be noted in this connection, with reference to curve B, that the same liquid recovery can be obtained at about 1220 pounds per square inch and $-20°$ F., as can be obtained at about 240 pounds per square inch and $-20°$ F. For practical operation according to the present invention, liquid recovery is effected at temperatures between about $-50°$ and $+60°$ F. and at a pressure between about 500 and 1200 pounds per square inch.

It will be understood that the phase diagram shown is not intended to be a precise picture of the phase relationships of the components of all mixtures treated according to the present invention. In fact, it is not precise with respect to the particular mixture on which it was based. That is to say that every point on the various curves was not determined. Enough points were determined, however, to indicate that the phase diagram takes the general shape shown, and this is offered for purposes of illustration and for a better understanding of the present invention.

In Fig. 3 is shown a family of curves which were produced by plotting pressure in pounds per square inch against gross liquid recovery in gallons per 1000 cubic feet of gas at various temperatures. It will be observed that in general the amount of gross liquid increases with the decrease in temperature. It can also be seen that the amount of recovery passes through a maximum with increase in pressure and then falls off, indicating that the condensation occurring at the point of maximum recovery is retrograde condensation. In almost every instance the maximum gross liquid recovery occurred at a pressure above 700 pounds per square inch, although at some temperatures the amount of recovery was very close to maximum at 500 pounds per square inch and fell off rapidly from this pressure. Again, it will be noted that at 60° F. the amount of recovery fell off rapidly after about 1200 pounds per square inch, and that this is also true at 20° and 40° F.

It will be understood that these relationships may change for specifically different mixtures, such that maximum liquid recovery might be closer to 1200 pounds per square inch. The general relationship holds, however, for mixtures of this type.

In Fig. 4 is shown a family of curves obtained by plotting net gasoline, R. V. P. 20 pounds per square inch, in gallons per 1000 cubic feet against pressure in pounds per square inch, the original gas containing about 0.52 gallon per 1000 cubic feet. It will be understood that the reason for the lower values in this family of curves is that the condensate represented in the family of curves in Fig. 3 includes normally gaseous constituents dissolved in the liquid. In this case it can be seen that maximum net liquid recovery occurs more nearly at 500 pounds per square inch than at 700 pounds per square inch, and that beyond 1200 pounds per square inch the recovery falls off even more sharply than was the case with gross liquid recovery. Beginning at about 40° F., 700 pounds per square inch appears to be the minimum preferred pressure for increase in temperature.

Referring to Fig. 5, parts corresponding to those shown in Fig. 1 bear the same numerals. The apparatus shown in this figure differs from that shown in Fig. 1 by including a line for the circulation to the heat exchanger and the separator of a liquid having a greater affinity for water than oil. This liquid should be one which remains liquid at temperatures as low as those at which it is desired to operate and will boil at least as high as butane. In general, this liquid is mixed with the wet gas before the latter is expanded into the separator, whereby the water in the wet gas is taken up by the liquid which settles out in the separator with the oil, with which it, or at least its water solution, must be immiscible, in order to be operative. Suitable liquids for use in this connection are the various glycols, such as ethylene glycol, glycerol, concentrated inorganic salt solutions, and the like. Referring to the drawings, line 11 is provided at the bottom of the separator 4 for drawing off the water absorbent and conducting it back to the feed inlet 1, preferably after compressing it by pump 12 to a pressure such that it will enter line 1. In practice, a certain amount of this liquid will be periodically withdrawn and replaced by fresh liquid, or the liquid itself will be periodically or continuously subjected to a flash distillation for separation of the liquid from water.

In Fig. 6 is shown a stabilization tower which may be used in conjunction with the apparatus shown in Fig. 1. Stabilization tower 13 is provided with a gas draw off 14 at its upper end, and a liquid drawoff 15 at its lower end. It is also provided with a steam coil 16 for vaporizing undesired constituents at the pressure employed. The chief undesired constituents are propane and lower hydrocarbons, and a certain percentage of the butane which must be removed in order to reduce the vapor pressure of the gasoline to the desired amount. Line 10 from tower 4 of Fig. 1 passes into the top of tower 13 in which it is formed into a coil 17, and then back out to a heat exchanger 18 where it is passed in heat exchange relation to the stabilized gasoline which has been heated up by the steam coil carried in line 15. The stabilized condensate is withdrawn from the heat exchanger by line 19. Prior to its entry into the tower the unstable condensate is passed through an expansion valve 20 which causes expansion of this condensate in coil 17 with consequent cooling. By this expedient the pressure of the condensate is utilized to produce reflux in the top of the stabilizer by reducing the temperature of coil 17 to any desired point, and easily to the temperature required to maintain the composition of the overhead so that it contains nothing higher than butane.

In Fig. 7 is shown a tower which may be substituted for separator 4 in Fig. 1, and which enables the operator to recover the dry gas which has been dissolved in the condensate from the condensate without a loss of its pressure. The tower shown in Fig. 7 is indicated by numeral 21 and is provided with a partition 22 intermediate its ends dividing it into two zones. The wet gas is introduced into the upper zone through line 1 and expansion valve 3 and with the zone maintained under conditions heretofore proposed the condensate collects at the bottom thereof, while dry gas passes off at the top through line 5. The condensate is withdrawn through line 23 and passed through heat exchanger 24 into the lower end of the bottom zone which contains a steam coil 25, which is supplied with steam at a suitable temperature to drive off normally gaseous constituents of the condensate at the pressure maintained in the system. The gases so driven off are withdrawn through the lower section through line 26 and passed in heat exchange relation to the liquid withdrawn from the upper zone, and are then discharged into the upper end of the upper zone to join the dry gas leaving the system through line 5. The condensate with a reduced content of normally gaseous constituents, such as methane and ethane, is withdrawn from the lower section through line 27.

In the system shown in Fig. 8 the object is to recover dry gas which has been dissolved in the condensate and at the same time stabilize the condensate without the loss in the dry gas of constituents, such as propane and butane, which may be desired for some other purpose. In this system the rich gas is introduced through line 28 into a heat exchanger 29 where it gives up heat to the condensate initially produced, and is then passed through a second heat exchanger 30 where it gives up heat to the dry gas initially produced, and then passes through expansion valve 31 into the separator 34. The condensate is withdrawn from the separator through line 35 and passed to heat exchanger 29, while dry gas is withdrawn from the separator through line 36 and passed through heat exchanger 30, and then to a second heat exchanger 37 hereinafter referred to. Separator 34 is provided at its upper end with a cooling coil 38 which need not be used if sufficient temperature reduction can be secured by expansion of the wet gas.

The condensate leaving tower 34 contains some dry gas dissolved therein, and this condensate is heated up in heat exchanger 29 and then passes through line 52 to a flash drum 39 from the upper end of which the dry gas passes off through line 40. This dry gas inevitably carries off some desirable constituents with it, so it is added to the feed stock at the low pressure side of expansion valve 31. The remainder of the condensate is withdrawn from drum 39 through line 41 and is discharged through a heat exchanger 42 into a stabilization drum 43. Stabilizer 43 is provided at its bottom with a heating coil 44 and at its top with a cooling coil 45. The overhead from the stabilizer passes off through line 46 to heat exchanger 37 where it is cooled by the dry gas withdrawn from separator 34, and is then combined with the fresh feed at the low pressure side of expansion valve 31.

Stabilized liquid is withdrawn from the bottom of stabilizer 43 through line 47, and is conducted to a heat exchanger 42, where it imparts its heat to the incoming condensate. Line 41 is provided with a bypass 48 containing a pump 49, while line 46 is provided with a bypass 50 containing a compressor 51. Since it is desirable to have the dry gas from the whole system at the pressure maintained in separator 34, it is necessary either to compress the condensate from flash drum 39 and to operate the stabilizer 43 at this pressure, or to compress the overhead from the stabilizer. The former is generally the more economical procedure.

In order to impart flexibility to the system, line 52 is provided with a bypass 53 in which is a pump 54, and line 40 is provided with a bypass 55 in which is a compressor 56. Thus separator 39 may be operated at fairly low pressures, and the gases resulting therefrom are compressed in compressor 56, and the liquids pumped by pump 49 into stabilizer 43. Alternatively, stabilizer 43 can also be operated at low pressure and the gases resulting therefrom compressed by compressor 51. Or by the use of pump 54, the separator 39 may be operated at relatively high pressure and the stabilizer 43 at relatively low pressure.

As can be seen, the system illustrated in Fig. 8 utilizes to the fullest extent the energy contained in the various components of the initial mixture, and yields a stabilized gasoline and a dry gas at a high pressure which may be used for repressuring producing formations or for any other purpose where high pressure gas is desired. It will be understood that the drying arrangement shown in Fig. 5 is applicable to the apparatus shown in Fig. 8 as well as to the apparatus shown in the other figures. Likewise, the condensate line in Fig. 8, instead of going to the first heat exchanger, can go to the stabilizing tower as shown in Fig. 6.

From the above description, it will be apparent that the present invention relates to the recovery of condensable constituents from high pressure gases containing them, the recovery to be effected at a pressure of at least 500 pounds per square inch. As has been shown, the operation is preferably conducted at a pressure of at least 700 pounds per square inch and may be conducted at pressures as high as 1200 pounds per square inch, provided the initial wet gas is available at pressures substantially in excess of 1200 pounds per square inch, such as 2000 pounds per square inch which is quite common in many fields. The separator may be maintained at any convenient temperature of between about —50 and +60° F., the lower temperatures in this case being rather cheaply attained, when the wet gas is at a sufficiently high pressure, by expansion of the gas to the separation pressure with suitable heat exchange.

In the appended drawings apparatus has been shown in which the high pressure gas is expanded in the separator so that the desired temperature in the separator can be attained. In some cases the initial gas is not at sufficiently high pressure to produce the desired low temperature merely by expansion to the operating pressure. In this case it will be evident that the temperature of the separator may be maintained by extraneous refrigeration, such as by the employment of cooling coils such as shown in Fig. 8.

The method, as practiced in the various types of apparatus shown in the drawings, consists in taking a gas, containing normally liquid constituents, above the desired separation temperature, preferably dehydrating the gas, cooling the gas initially to a lower temperature and then releasing the pressure on the gas to bring it to the desired separation pressure and temperature. It will be understood that no particular order of steps is necessary in arriving at the separation conditions. The important point is the arrival at the separation conditions and the maintenance of these conditions. Thus, for example, the gas can initially be expanded to the separation pressure and then cooled, if further cooling is necessary, to the separation temperature. Conversely, the gas may be cooled wholly by expansion without the aid of heat exchangers or extraneous refrigeration.

It will be apparent that the apparatus shown in the various figures is merely illustrative and may be changed substantially without departing from the scope of the present invention. Mention may be made of the fact that all of the low temperature vessels should be encased with a heavy lagging so as to conserve energy to the greatest possible extent.

The nature and objects of the present invention having been thus described and illustrated, what is claimed as new and useful and is desired to be secured by Letters Patent is:

1. The method of recovering desirable liquefiable constituents from natural gas which is initially at a high pressure within the retrograde condensation range of said constituents which comprises, cooling said gas sufficiently to condense said constituents while reducing said high pressure substantially only within the retrograde condensation range of said constituents at the reduced temperature, and separating the resulting condensed constituents from uncondensed gas.

2. The method of recovering desirable liquefiable constituents from natural gas which is initially at a high pressure within the retrograde condensation range of said constituents which comprises, cooling said gas sufficiently to condense said constituents while the gas is maintained under said high pressure, thereafter reducing said high pressure substantially only within the retrograde condensation range of said constituents at the reduced temperature, and separating the resulting condensed constituents from uncondensed gas.

3. The method of recovering desirable liquefiable constituents from natural gas which is initially at a high pressure within the retrograde condensation range of said constituents which comprises, precooling said gas while under said high pressure to a temperature below its initial temperature, but above the final desired temperature for condensation of said constituents, then reducing said high pressure substantially only within the retrograde condensation range of said constituents at said final temperature and thereby to further cool said gas to said final temperature, and separating the resulting condensed constituents from uncondensed gas.

4. The method of recovering desirable liquefiable constituents from natural gas which is initially at a high pressure within the retrograde condensation range of said constituents which comprises, cooling said gas below its initial temperature while said gas is maintained under said high pressure, thereafter reducing said high pressure sufficiently only to produce retrograde condensation of said constituents at the reduced temperature, separating the resulting condensed constituents from uncondensed gas, and utilizing the refrigeration effect produced in the gas by the reduction in pressure to accomplish the aforesaid cooling.

5. The method of recovering desirable liquefiable constituents from natural gas which is initially at a pressure above 700 pounds per square inch which comprises, cooling said gas to a suitable condensation temperature for said constituents, reducing the initial pressure of the gas substantially only within the retrograde condensation range of said constituents at said condensation temperature but not below 700 pounds per square inch, and separating the resulting condensed constituents from uncondensed gas.

6. The method of recovering desirable liquefiable constituents from natural gas which is initially at a pressure above 700 pounds per square inch which comprises, cooling said gas while under said pressure to a temperature below its initial temperature but above the final desired temperature, then reducing said initial pressure substantially only within the retrograde condensation range of said constituents and to thereby further cool said gas to said final temperature, and separating the resulting condensed constituents from uncondensed gas.

7. The method of recovering desirable liquefiable constituents from gas which is initially at a pressure above 700 pounds per square inch which comprises, subjecting said gas to multi-stage cooling to condense said constituents while reducing the initial pressure of said gas substantially only within the retrograde condensation range of the desired constituents at the final temperature, separating condensed constituents from uncondensed gas, and cooling the gas in at least one of the cooling stages by the refrigeration effect produced by the reduction in pressure of the gas.

8. The method of recovering gasoline constituents from natural gas which is initially at a pressure above 700 pounds per square inch which comprises, subjecting said gas to multi-stage cooling to condense said constituents while reducing the initial pressure of the gas substantially only within the retrograde condensation range of the desired constituents at the final temperature but not below 700 pounds per square inch, separating condensed constituents from uncondensed gas, and cooling the gas in at least one of the cooling stages by the refrigeration effect produced by the reduction in pressure of the gas.

9. The method of recovering desirable liquefiable constituents from gas which is initially at a high pressure within the retrograde condensation range of said constituents which comprises, cooling said gas in a series of cooling stages of progressively decreasing temperature to a final temperature suitable to condense said constituents, reducing said pressure only in the final one of said cooling stages and sufficiently only to produce retrograde condensation of said constituents and to cool said gas by the expansion thereof to said final temperature, separating condensed constituents from uncondensed gas in said final cooling stage, and utilizing said uncondensed gas as a cooling medium in an earlier one of said cooling stages.

10. The method of recovering desirable liquefiable constituents from gas which is initially at a high pressure within the retrograde condensation range of said constituents which comprises, reducing the initial pressure of the gas substantially only within the retrograde condensation range of said constituents, thereafter cooling said gas to condense said constituents, and separating the resulting condensed constituents from uncondensed gas.

11. The method of recovering desirable liquefiable constituents from gas which is initially at a pressure above 700 pounds per square inch which comprises, reducing the initial pressure of the gas substantially only within the retrograde condensation range of said constituents but not below 700 pounds per square inch, thereafter cooling said gas to condense said constituents, and separating the resulting condensed constituents from uncondensed gas.

12. The method of recovering desirable liquefiable constituents from natural gas which is initially at a high pressure within the retrograde condensation range of said constituents which comprises, cooling said gas sufficiently to condense said constituents while the gas is maintained under said high pressure, thereafter reducing said high pressure substantially only within the retrograde condensation range of said constituents at the reduced temperature, separating the resulting condensed constituents from uncondensed gas, and passing said uncondensed gas into indirect heat exchange relationship with said natural gas prior to the reduction in pressure thereof.

13. The method of recovering desirable liquefiable constituents from gas which is initially at a pressure above about 500 lbs./sq. in. which comprises, cooling said gas to a suitable condensation temperature for said constituents, reducing the initial pressure of the gas to a pressure within the retrograde condensation range of said constituents at the temperature of operation but not below 500 lbs./sq. in., and separating the resulting condensed constituents from uncondensed gas.

14. The method of recovering desirable liquefiable constituents from gas which is initially at a pressure above the retrograde condensation range of said constituents which comprises, cooling said gas to a suitable condensation temperature for said constituents, reducing the intial pressure of the gas to a pressure within the retrograde condensation range of said constituents at the temperature of operation, and separating the resulting condensed constituents from uncondensed gas.

15. The method of recovering desirable liquefiable constituents from gas which is initially at a pressure above 500 lbs./sq. in. which comprises, cooling said gas by heat exchange with a cooling medium to a suitable condensation temperature for said constituents, reducing the initial pressure of the gas to a pressure within the retrograde condensation range of said constituents at the temperature of operation, but not below about 500 lbs./sq. in., and separating the resulting condensed constituents from uncondensed gas.

16. The method of recovering desirable liquefiable constituents from gas which is initially at a pressure of considerably above about 500 lbs./sq. in. which comprises, cooling said gas to a suitable condensation temperature within the range of +60 to −50° F., reducing the initial pressure of the gas to a pressure within the retrograde condensation range of said constituents at the selected temperature, but not below 500 lbs./sq. in., and separating the resulting condensed constituents from uncondensed gas.

17. The method of recovering desirable liquefiable constituents from gas which is initially at a pressure substantially above about 500 lbs./sq. in., which comprises cooling said gas to a suitable condensation temperature not in excess of about 20° F., reducing the initial pressure of the gas to a pressure within the retrograde condensation range of said constituents at the temperature of operation, but not below 500 lbs./sq. in., and separating the resulting condensed constituents from the uncondensed gas.

18. The method of recovering desirable liquefiable constituents from gas which is initially at a pressure substantially above about 1200 lbs./sq. in. which comprises, cooling said gas to a temperature within the range between +60 and −50° F., reducing the initial pressure of the gas to a pressure below 1200 lbs./sq. in. but not below 500 lbs./sq. in., and separating the resulting condensed constituents from uncondensed gas.

19. The method of recovering desirable liquefiable constituents from gas which is initially at a pressure above the retrograde condensation range of said constituents which comprises, cooling said gas to a suitable condensation temperature for said constituents within the range of +60 to −50° F., reducing the initial pressure of the gas to a pressure within the retrograde condensation range of said constituents at the temperature of operation, and separating the resulting condensed constituents from uncondensed gas.

STUART E. BUCKLEY.